Figure 8:
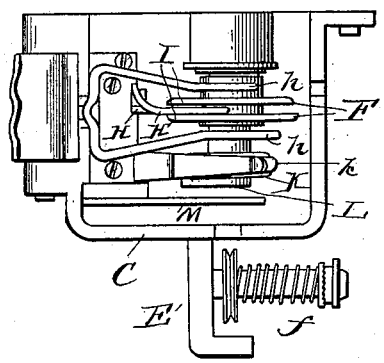

No. 615,647. Patented Dec. 6, 1898.
R. G. WOODWARD.
THREAD CONTROLLING MECHANISM FOR SEWING MACHINES.
(Application filed Oct. 29, 1894.)
(No Model.) 5 Sheets—Sheet 1.
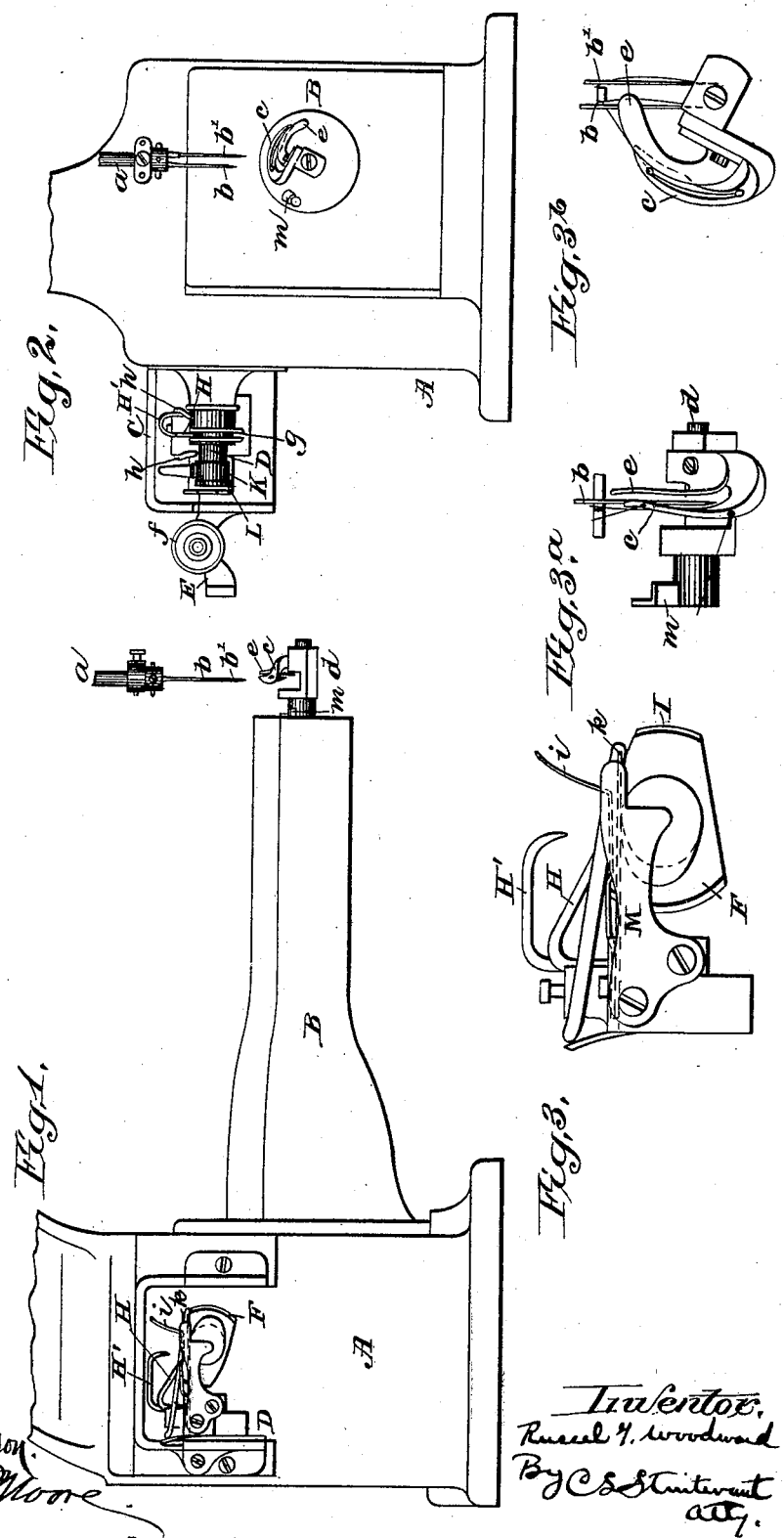
Witnesses.
Geo. S. Gleason
Gales P. Moore
Inventor.
Russel G. Woodward
By C. S. Sturtevant
atty.

No. 615,647. Patented Dec. 6, 1898.
R. G. WOODWARD.
THREAD CONTROLLING MECHANISM FOR SEWING MACHINES.
(Application filed Oct. 29, 1894.)
(No Model.) 5 Sheets—Sheet 2.
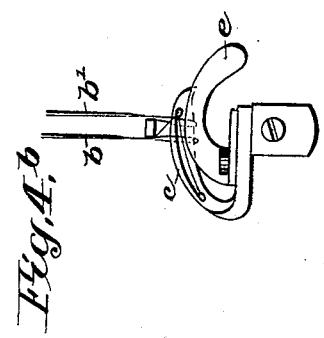
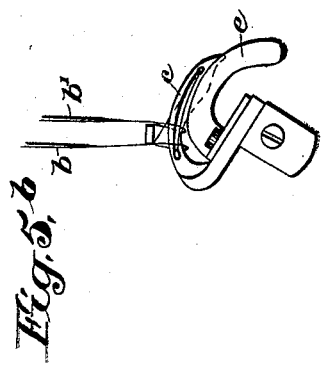
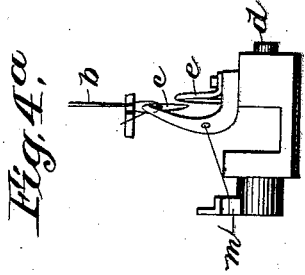
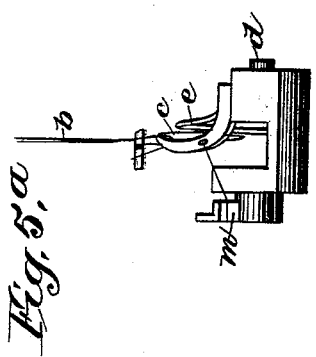
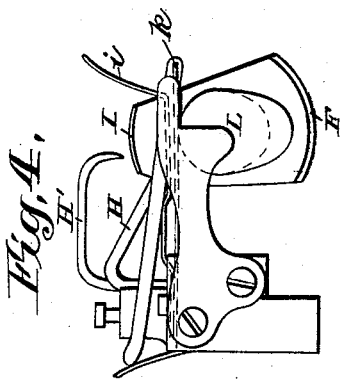
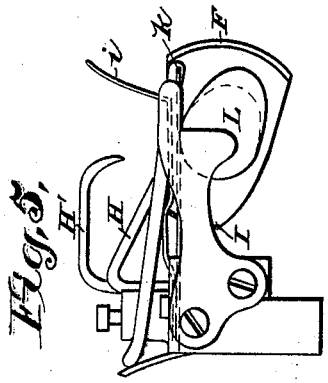
Witnesses,
Geo. S. Gleason.
Gales P. Moore.
Inventor,
Russel G. Woodward
By C. S. Sturtevant
Atty.

No. 615,647. Patented Dec. 6, 1898.
R. G. WOODWARD.
THREAD CONTROLLING MECHANISM FOR SEWING MACHINES.
(Application filed Oct. 29, 1894.)
(No Model.) 5 Sheets—Sheet 3.
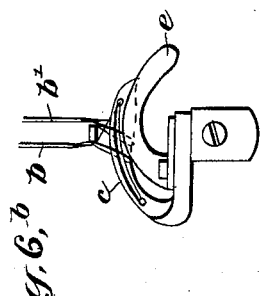
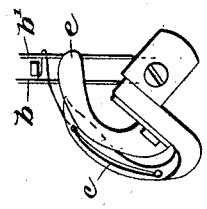
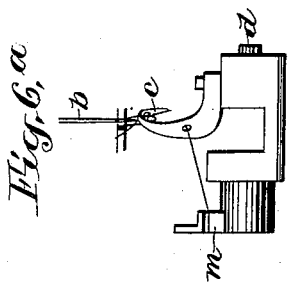
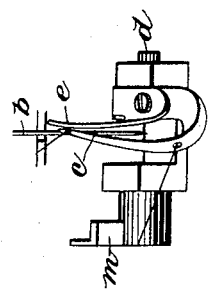
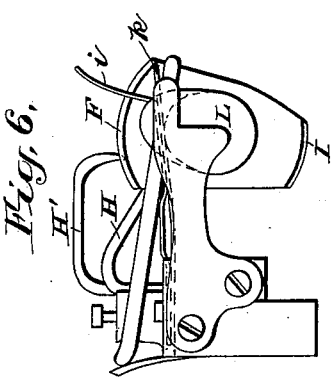
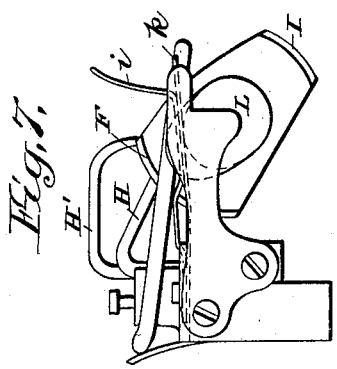
Witnesses.
Geo. S. Gleason.
Giles P. Moore
Inventor,
Russel H. Woodward.
By C. J. Sturtevant
atty.

No. 615,647. Patented Dec. 6, 1898.
R. G. WOODWARD.
THREAD CONTROLLING MECHANISM FOR SEWING MACHINES.
(Application filed Oct. 29, 1894.)
(No Model.) 5 Sheets—Sheet 4.

Witnesses:
J. M. Fowler
Grace Goodman.

Inventor:
Russel G. Woodward
By Chas. L. Sturtevant
Atty.

No. 615,647. Patented Dec. 6, 1898.
R. G. WOODWARD.
THREAD CONTROLLING MECHANISM FOR SEWING MACHINES.
(Application filed Oct. 29, 1894.)
(No Model.) 5 Sheets—Sheet 5.
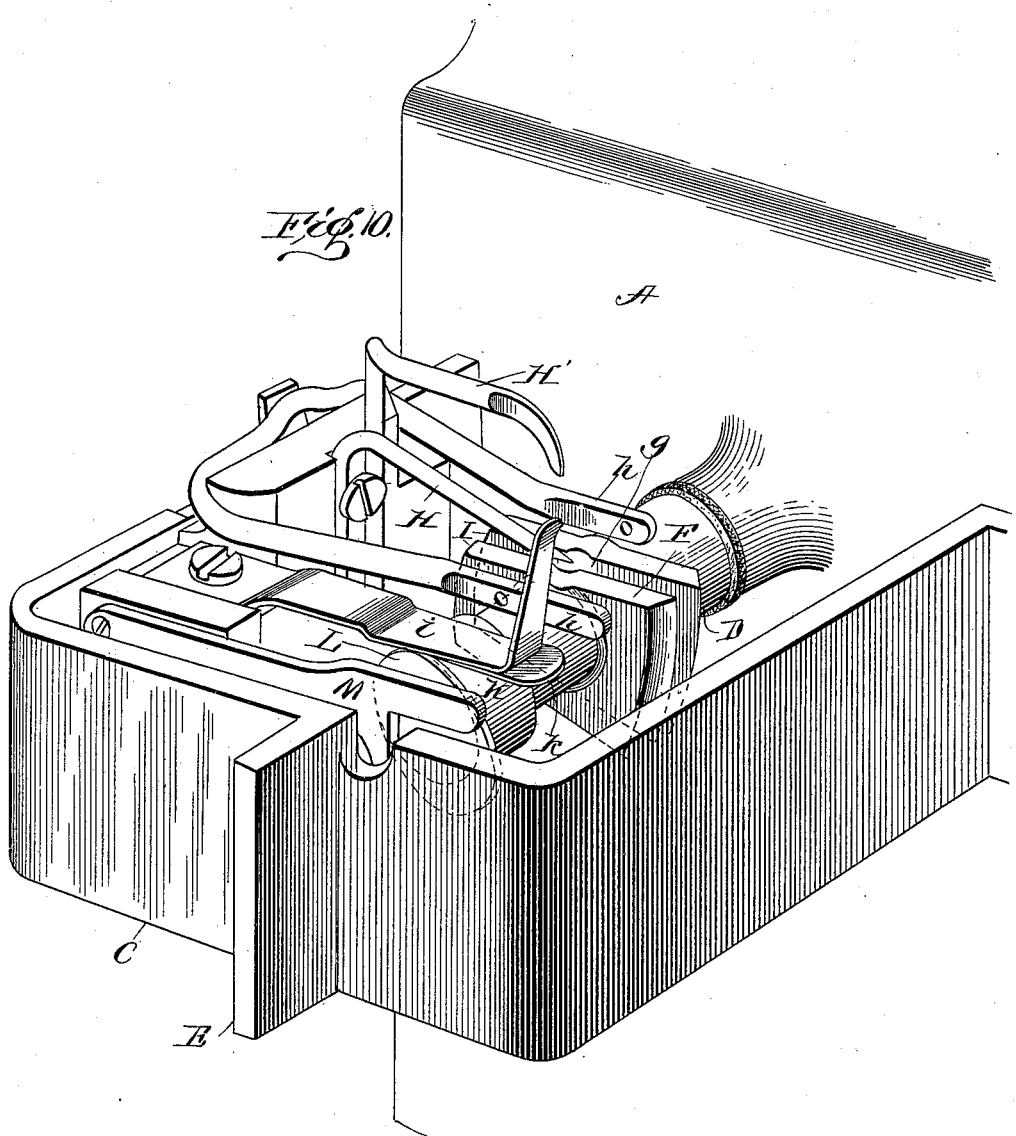

UNITED STATES PATENT OFFICE.

RUSSEL G. WOODWARD, OF WAUKEGAN, ILLINOIS, ASSIGNOR TO THE UNION SPECIAL SEWING MACHINE COMPANY, OF CHICAGO, ILLINOIS.

THREAD-CONTROLLING MECHANISM FOR SEWING-MACHINES.

SPECIFICATION forming part of Letters Patent No. 615,647, dated December 6, 1898.

Application filed October 29, 1894. Serial No. 527,129. (No model.)

*To all whom it may concern:*

Be it known that I, RUSSEL G. WOODWARD, a citizen of the United States, residing at Waukegan, in the county of Lake, State of Illinois, have invented certain new and useful Improvements in Thread-Controlling Mechanisms for Sewing-Machines, of which the following is a description, reference being had to the accompanying drawings and to the letters of reference marked thereon.

My invention relates to an improvement in sewing-machines, and particularly to the mechanism for taking up and controlling the slack in the thread.

I herein show my invention as applied for taking up and controlling the slack of the looper-thread; but it will be understood that the same devices and combination of devices may be used in controlling the slack of the upper or needle thread.

In Patent No. 299,569 granted to another and myself we have shown a take-up device comprising two rotating cam-disks upon the main shaft and a stationary throw-off arm, the thread being compelled to ride over the edges of the disks by guides located at either side thereof and within the circle described by the outer edge of the disks. In the rotation of the disk the straight edges thereof catch the portion of thread between the guides and carry it up with them (thereby taking up the slack from the looper) until the throw-off releases it, at which time the looper is ready for another forward impulse and not only draws the slack thus temporarily taken care of by the take-up, but a stitch length in addition. In addition to this we provide an intermittent device composed of an upper and a lower spring brought together to clasp the thread passing between them at the proper intervals by suitable mechanism, whereby this intermittent device acts to stop the feed of the fresh thread during the operations of the take-up, and to compel the take-up to engage the slack already existing, whereby the thread is positively controlled except during the forward movements of the looper, at which time it may be left wholly or substantially free from tension and the elastic character of the stitch be obtained.

My present invention is subordinate to and a development of the invention shown, described, and claimed in the above patent, and this improvement has been found more practical to certain styles of machines than the old form.

I have found in practice that the particular construction of take-up device as illustrated in said patent could not be satisfactorily applied to a machine having a very small cylindrical casing and having its main shaft extending transversely across the rear end of the machine, as shown in patent of L. Muther, Elias C. Holland, and myself, granted May 25, 1897, No. 583,415, by reason of the fact that the looper has a very limited forward movement, moving in a circle of comparatively small radius. Hence not enough thread would be pulled off by it in its forward movement to allow for the movement of the thread around the farther needle when two are used, in such machines the feed being longitudinally of the arm and the looper moving transversely. I also find that the present form more properly keeps a taut thread while the looper is moving forward.

To provide a take-up and controlling mechanism particularly adapted for the above machine has been my object, though I do not desire as to all its featurs to be restricted to such.

The invention consists in the matters hereinafter described, and referred to in the appended claims.

My invention is illustrated in the accompanying drawings, in which—

Figure 9:
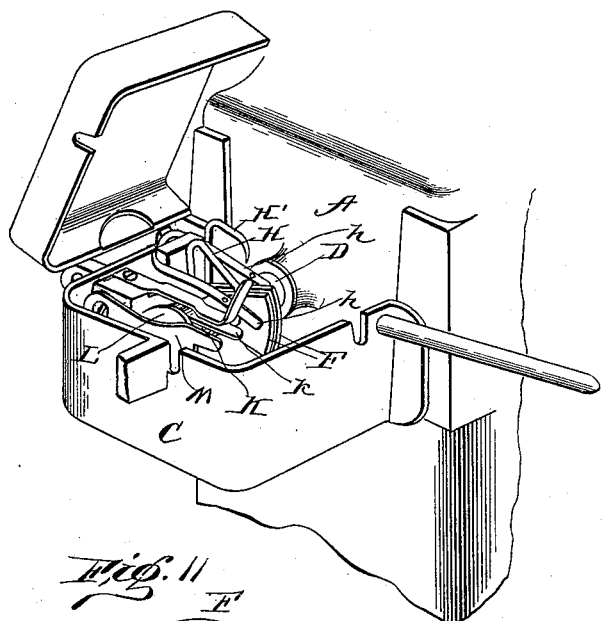
Figure 11:
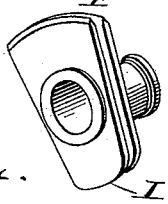

Figure 1 is a side elevation of so much of a sewing-machine as is necessary to a correct understanding of my invention. Fig. 2 is an end view thereof. Figs. 3, 4, 5, 6, and 7, and Figs. $3^a$, $3^b$, $4^a$, $4^b$, $5^a$, $5^b$, $6^a$, $6^b$, $7^a$, and $7^b$ represent, respectively, views of the take-up in various positions and the side and end views of the looper at each position of the take-up. Fig. 8 is a top plan view of the take-up mechanism detached. Fig. 9 is a perspective view illustrating the same. Fig. 10 is an enlarged perspective view, and Fig. 11 is a detail view, of the distribution of parts having two cam-surfaces, one acting as a take-up and the other as a slack-controller.

Referring now to Figs. 1 and 2, A represents a portion of the standard of a sewing-machine embodying my invention. B represents the cylindrical casing; $a$, the needle-bar; $b$, the inner and $b'$ the outer needle; $c$, the looper; $d$, the head of the shaft on which it is secured, and $e$ the looper-guard finger. Upon the side of the standard is secured a rectangular box C, in which the take-up mechanism is supported, said parts being carried on the end of the main shaft D of the machine, which is journaled in bearings in the standard A.

A lug E is formed on the box C, and upon this is supported a tension $f$, through which the thread which supplies the looper is led from a spool. Upon the main shaft D is the take-up device comprising a rotating cam-disk formed with two cam-surfaces on it, one, F, acting as a take-up for the thread in the rearward movement of the looper and having a groove $g$, in which the end of the stationary throw-off arm H rests, guides $h\ h$ being provided upon either side of the cam-disk to compel the thread to ride over the edges of the disks. A retaining-arm H' is also provided to hold the thread on the cam-surface. The second cam-surface I on the disk, also grooved for the end of the throw-off arm H, is made on a radius less than the cam-surface F, so that the retaining-arm H' does not act on the thread while the latter is engaged by this surface. This cam-surface acts on the thread in the forward movement of the looper and simply retains the slack (that has been pulled off by the supplemental pull-off hereinafter to be referred to) while the looper moves forward, since owing to the limited movement of which the looper is capable it could not pull off sufficient thread to carry around the outer needle. Hence supplemental means have to be devised for this purpose; but the slack caused by that must be taken up until a loose thread is needed.

The intermittent stop device is composed of the upper and lower nipper-springs $i\ k$, the lower of which is closed against the upper by means of the cam K, preferably of wood-fiber, which needs no lubricant, and therefore does not soil the thread, this cam being so arranged that in the forward movement of the looper the upper springs do not hold the thread, but allow the looper to pull directly through the tension. When the looper is moving backward, however, and there is a slack thread, the nipper-springs close and hold the thread and the take-up acts to take up slack without its pulling off any thread. Other means may of course be devised for operating these nipper-springs.

As above intimated, while in the usual machine the looper in its forward movement draws the slack which has been temporarily taken care of by the take-up and in addition thereto thread sufficient to make another stitch, it sometimes happens that owing to the diameter of the bed-plate only a limited movement can be given the looper, and in case two needles are used it is necessary to provide additional means for pulling off some thread from the spool to supply the deficit. I accomplish this result by securing on the main shaft and between the nipper-springs and the tension a cam L, which is so timed as to act when the nipper-springs are holding the thread tightly, so that said cam will pull from the spool a slight amount of thread. In order to prevent the thread from being carried around by the supplemental pull-off, I provide the retaining-guide M, against which the thread is carried by the pull-off. It will be understood that this guide M may be dispensed with and the same result accomplished by making the pull-off with a groove in its periphery and providing a cast-off arm similar to H to work in conjunction with it.

The various positions of the parts are shown in the various views, Figs. 3, 3$^a$, 3$^b$, &c. In the first, Figs. 3, 3$^a$, and 3$^b$, the looper is clear back, the needles at the extreme limit of their downward movement, the looper-thread is up through the needle-slot, and the thread is taut, the take-up being inactive. In the second position, Figs. 4, 4$^a$, and 4$^b$, the looper has moved forward and entered the needle-thread loops. At this time the cam-surface I is controlling the slack to prevent the looper from carrying too much loose thread on its forward movement and the thread is taut across the under side of the guide or lug $m$ on the end of the casing. In the third position, Figs. 5, 5$^a$, and 5$^b$, the needles are up, the looper forward, and the take-up cam F ready to take slack when the looper moves back. The nipper-springs are open. In the fourth position, Figs. 6, 6$^a$, and 6$^b$, the needles are coming down and both have caught the looper-thread, the looper is on its backward movement, the take-up is ready to cast off, having taken up the slack in passing from the third to the fourth positions, the cam K has closed the nipper-springs, and the cam L has pulled off a slight amount of thread from the spool, which the looper uses up in passing forward and around the farther needle $b'$. In the fifth position, Figs. 7, 7$^a$, and 7$^b$, the looper is still going backward, the thread has been released from the nipper-spring, and the thread is taut across the finger of the throat-plate by the looper coming back and is held taut by the retaining-finger in the take-up.

I have discovered that one of the principal advantages of my invention lies in the fact that by the arrangement of the supplemental pull-off I can use a very poor and cheap quality of thread for the looper-thread, which it is impossible to do with the ordinary form of take-up.

Having thus described my invention, what I claim, and desire to secure by Letters Patent, is—

1. In a sewing-machine in combination with the stitch-forming mechanism, a driving-shaft, a thread-controlling mechanism consisting of a take-up cam and pull-off cam supported on said shaft, and a thread-grip; substantially as described.

2. In combination an under-thread-carrying device as a looper adapted to pull off thread in its forward movement, and a take-up device comprising a cam for taking up the slack of the under thread in the backward movement of the looper, and having a second cam for controlling the thread in the forward movement of the looper; substantially as described.

3. In combination with the looper carrying an under thread, the take-up device comprising a disk having two cam-surfaces, one of less diameter than the other, one acting to take up the thread in the backward movement of the looper, and the other for controlling the slack on the forward movement of the looper; substantially as described.

4. In combination, a thread-carrying device adapted to pull off thread in its forward movement, a take-up device comprising a cam for taking up the slack of the thread in the backward movement of the thread-carrying device, and a second cam for controlling the thread in the forward movement of the thread-carrying device, a thread-grip to grasp the thread while the first cam is acting, and a pull-off to pull off a fresh supply of thread while the grip is in operation; substantially as described.

In testimony whereof I affix my signature in presence of two witnesses.

RUSSEL G. WOODWARD.

Witnesses:
C. McNEIL,
W. L. SWIFT.